(12) United States Patent
Jinda

(10) Patent No.: US 7,454,899 B2
(45) Date of Patent: Nov. 25, 2008

(54) SECONDARY AIR SUPPLY SYSTEM FOR INTERNAL COMBUSTION ENGINE

(75) Inventor: Masahiro Jinda, Oakazaki (JP)

(73) Assignee: Futaba Industrial Co., Ltd., Okazaki-Shi, Aichi-Ken (JP)

( * ) Notice: Subject to any disclaimer, the term of this patent is extended or adjusted under 35 U.S.C. 154(b) by 0 days.

(21) Appl. No.: 11/589,609

(22) Filed: Oct. 30, 2006

(65) Prior Publication Data

US 2007/0095055 A1    May 3, 2007

(30) Foreign Application Priority Data

Oct. 31, 2005    (JP) .............................. 2005-316917

(51) Int. Cl.
*F01N 3/00* (2006.01)
(52) U.S. Cl. ............................... 60/289; 60/313; 60/323
(58) Field of Classification Search .................. 60/289, 60/304–306, 323
See application file for complete search history.

(56) References Cited

U.S. PATENT DOCUMENTS

| | | | | |
|---|---|---|---|---|
| 3,522,702 A | * | 8/1970 | Grosseau | 60/305 |
| 4,630,439 A | * | 12/1986 | Hudson, Jr. | 60/305 |
| 5,768,890 A | * | 6/1998 | Bekkering et al. | 60/305 |
| 7,197,869 B2 | * | 4/2007 | Kokubo et al. | 60/305 |

FOREIGN PATENT DOCUMENTS

| | | |
|---|---|---|
| JP | 5-10735 | 2/1993 |
| JP | 2003 03-5136 | 2/2003 |

* cited by examiner

*Primary Examiner*—Thomas E Denion
*Assistant Examiner*—Diem Tran
(74) *Attorney, Agent, or Firm*—Davis Bujold & Daniels P.L.L.C.

(57) ABSTRACT

A secondary air supply system for an internal combustion engine includes: a cylinder head of the internal combustion engine having a plurality of exhaust holes and a plurality of supply holes formed thereon; a supply path communicating the exhaust holes and the supply holes so as to supply secondary air into the supply holes; an exhaust manifold attached to the cylinder head, and provided with a flange having a plurality of communication holes penetrating the flange; a lower shell including connection holes respectively corresponding to the communication holes, the lower shell being secured to the flange such that the communication holes and the connection holes are aligned; and an upper shell combined with the lower shell so as to form the supply path, communicated with the plurality of connection holes, between the lower shell and the upper shell.

11 Claims, 8 Drawing Sheets

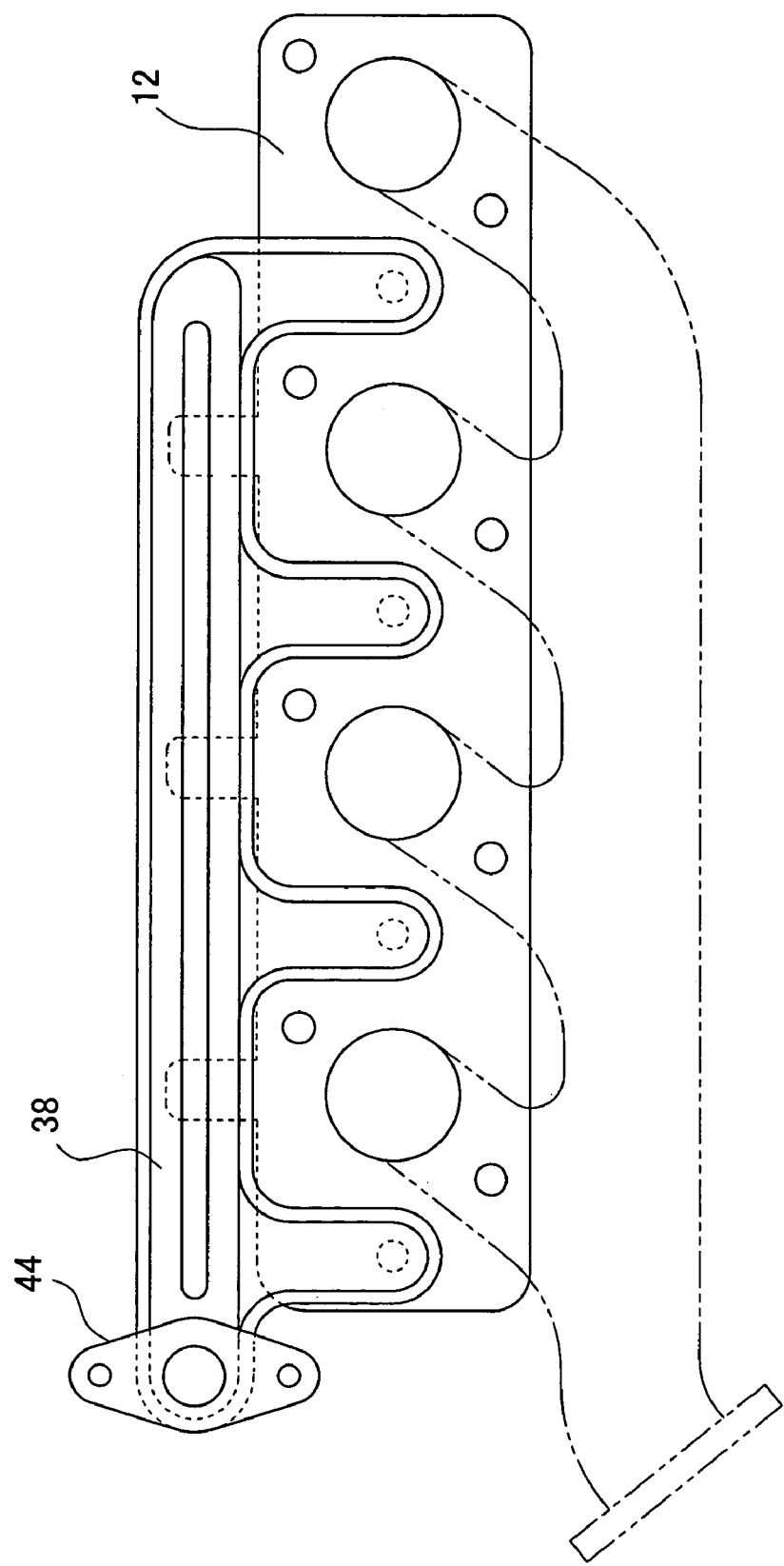

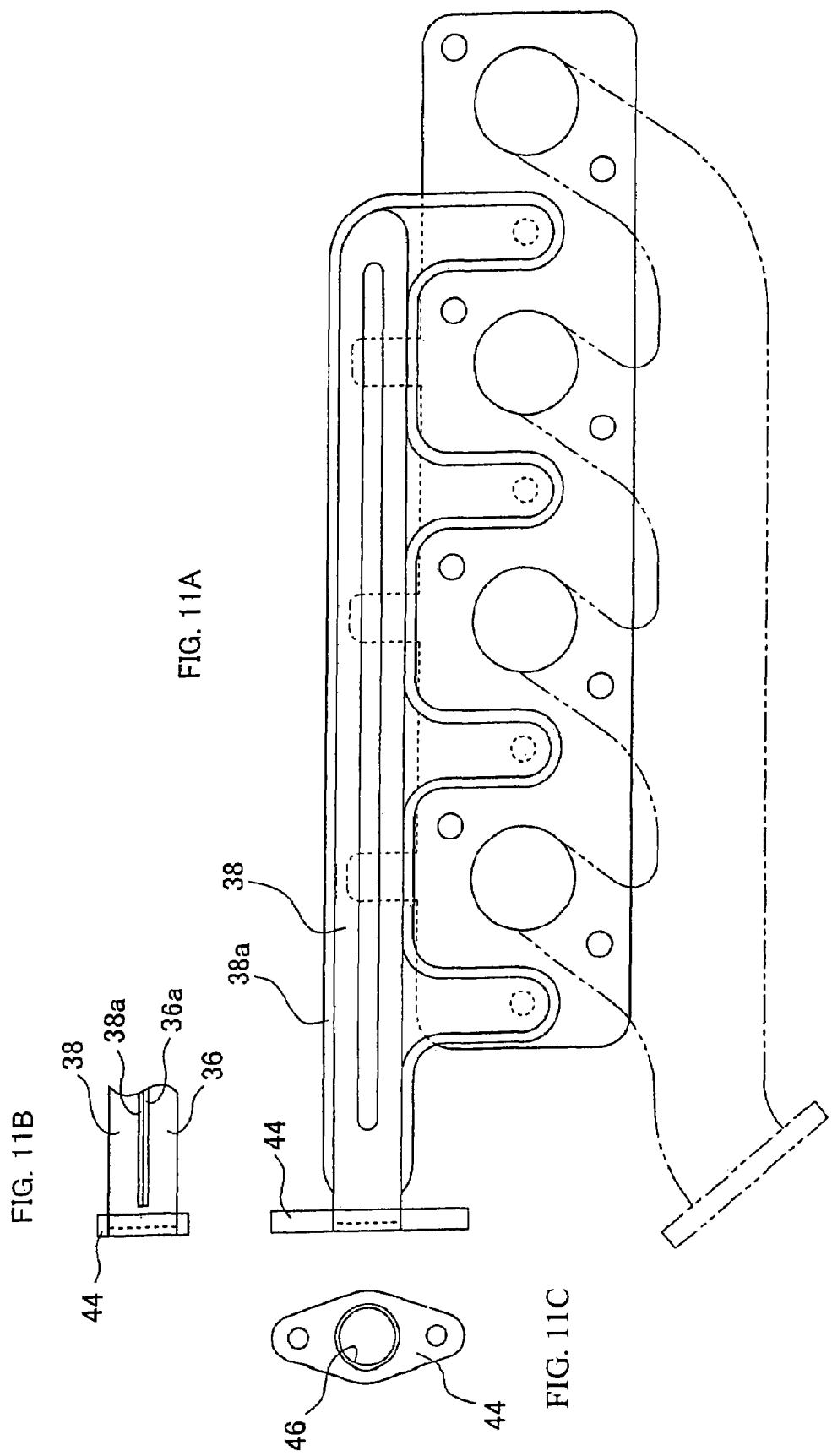

SECONDARY AIR SUPPLY SYSTEM FOR INTERNAL COMBUSTION ENGINE

BACKGROUND OF THE INVENTION (1) Field of the Invention

This invention relates to a secondary air supply system for an internal combustion engine which supplies secondary air, including some of intake air, which flows in an induction system of the internal combustion engine, and atmospheric air, to an exhaust system of the internal combustion engine.

(2) Background Art

Some conventional internal combustion engines are configured so as to supply secondary air to an exhaust system of a combustion engine in order to improve exhaust emission. In such an internal combustion engine, secondary air is supplied to the internal combustion engine through a supply path of the secondary air during a period wherein a catalyst, provided in the exhaust system, is not yet activated, such as when the internal engine is started while it is still cold. When the secondary air is supplied to the exhaust system, unburned gas contained in exhaust gas inside of the exhaust system is burned, and hydrocarbon (HC) and carbon monoxide (CO) in the exhaust gas become oxidized.

By oxidizing hydrocarbon and carbon monoxide in the exhaust gas, the residual amount of hydrocarbon and carbon monoxide is reduced, and hydrocarbon and carbon monoxide are inhibited from being externally released while a catalyst is not activated. Therefore, exhaust emission is improved. Moreover, since unburned gas is burned, the temperature of the catalyst quickly increases. Therefore, the catalyst comes into an activated state quickly after the cold internal combustion engine is started.

For the above-described secondary air supply system of an internal combustion engine, Unexamined Japanese Utility Model Publication No. 5-10735 discloses a system wherein a delivery pipe, disposed in the downstream of a supply path for secondary air, is connected to an exhaust manifold via two communication pipes. The exhaust manifold includes one pair of flanges and bosses respectively formed in an integrated manner. The flange is connected to a cylinder head of the internal combustion engine. The bosses are provided so as to connect the communication pipes in the vicinity of the connecting portion of branching pipes in which exhaust gas flows from respective combustion chambers. Inside of the delivery pipe and inside the exhaust manifold are communicated through the communication pipes.

On the other hand, Unexamined Japanese Patent Publication No. 2003-35136 discloses a system wherein a delivery path and one portion of a communication path are formed by providing holes on a flange of an exhaust manifold. The delivery path is provided for guiding secondary air along a cylinder head. One end of the communication path is connected to the delivery path. Another end of the communication path is open toward an exhaust port.

However, in the first conventional system, the delivery pipe is supported by two communication pipes in a cantilever manner. Therefore, the delivery pipe is unstably fixed, and might be vibrated. Moreover, the bosses, for attaching the communication pipes, need to be provided with two ports connected to two branching pipes. As a result, there has been a problem that positions for disposing the bosses are limited, and a balancing measure cannot be easily provided when the amount of supplied air into respective branching pipes becomes unbalanced.

In the second conventional system, the delivery path is formed by providing a hole on the flange. However, since the length of the delivery path is long, making a hole for such a long path is difficult. Moreover, the communication path on the flange is made by providing a hole on the flange so that the communication path provided on the cylinder head can be connected thereto. However, depending on the position of the communication path of the cylinder head, in some cases the communication path cannot be formed on the flange. Therefore, there has been a problem that the position of the communication path of the flange cannot be flexibly set.

One of the purposes of the present invention is to provide a secondary air supply system for an internal combustion engine in which a measure to inhibit vibration can be easily provided, and the position of the supply path can be flexibly set. The secondary air supply system according to the present invention is preferably manufactured easily.

SUMMARY OF THE INVENTION

In order to solve the above-described and other problems, the present invention is provided with the following measures. That is, the secondary air supply system for an internal combustion engine according to the present invention includes: a cylinder head of the internal combustion engine provided with a plurality of exhaust holes and a plurality of supply holes formed thereon; a supply path communicating the exhaust holes and the supply holes so as to supply secondary air into the supply holes; an exhaust manifold attached to the cylinder head, and provided with a flange having a plurality of communication holes penetrating the flange; a lower shell having connection holes respectively corresponding to the communication holes, the lower shell being secured to the flange such that the communication holes and the connection holes are aligned; and an upper shell combined with the lower shell so as to form the supply path, communicated with the plurality of connection holes, between the lower shell and the upper shell.

The setting of the supply path (the position of the supply holes and the sectional dimension of the path) can be flexible, because the shapes of the lower shell and the upper shell and the connection holes can be formed depending on the positions of the supply holes. Furthermore, the manufacturing can be easily performed because the lower shell and the upper shell can be formed by pressing.

A support portion, protruding toward the lower shell, may be integrally formed on the flange. Moreover, a small flange, attached to the lower shell and including flow holes communicated with the supply path, may be integrally formed with the flange. Additionally, the lower shell and the upper shell may be provided with end portions there around, and the end portions may be combined and welded together.

In the secondary air supply system according to the present invention, the rigidity of the system can be easily improved by providing support portions or rib portions, in case damage is caused on the supply path for secondary air. Therefore, a measure to inhibit vibration can be easily provided.

BRIEF DESCRIPTION OF THE DRAWINGS

The invention will now be described below, by way of example, with reference to the accompanying drawings, in which:

FIG. 10 is a diagram showing a variation wherein the small flange is connected to the upper shell; and FIGS. 11A, 11B, and 11C are diagrams showing a variation wherein the small flange is connected to a pipe formed with the upper shell and the lower shell.

DETAILED DESCRIPTION OF THE PREFERRED EMBODIMENT

Figure 1:
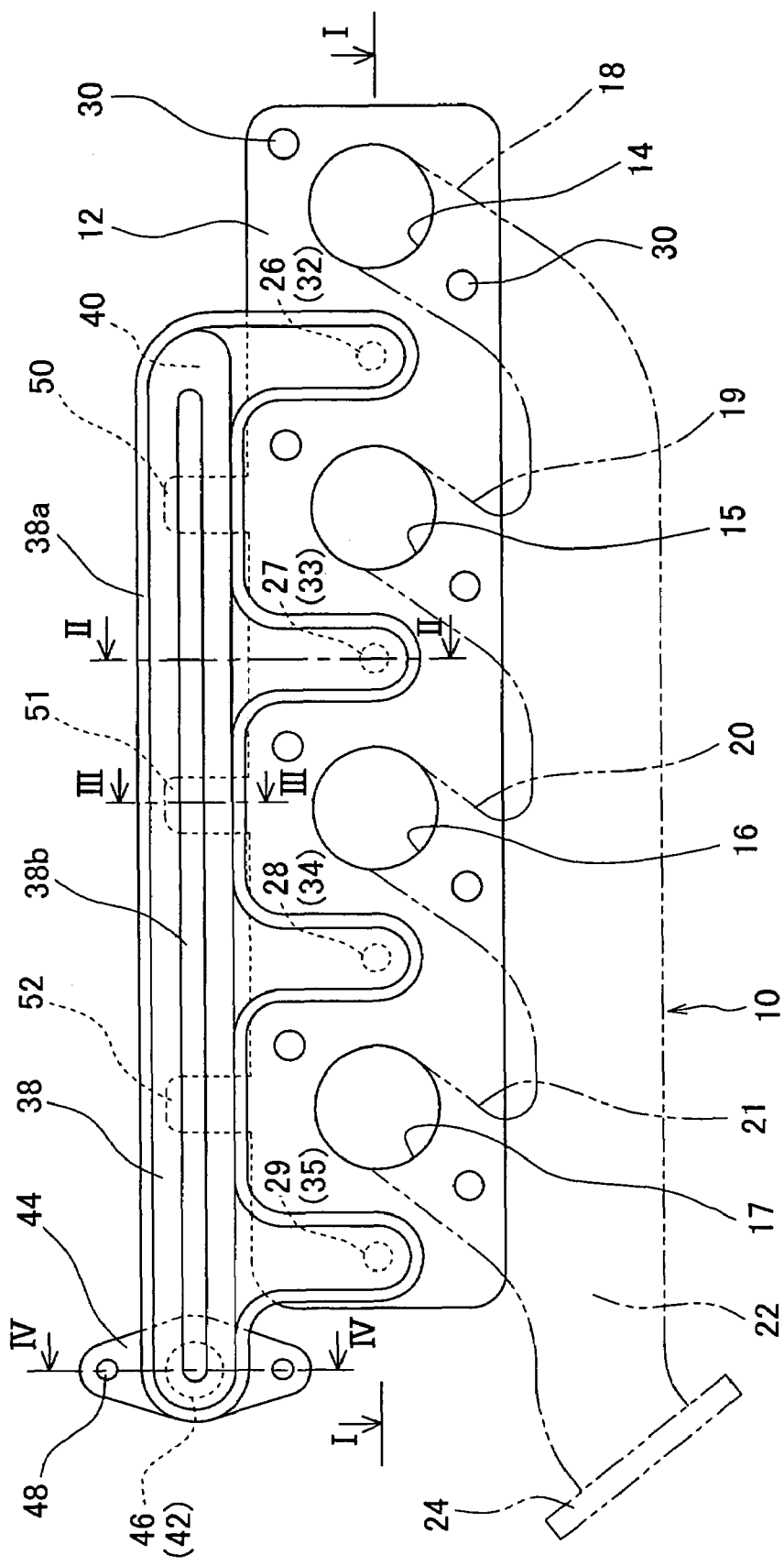
FIG. 1 is a diagram showing the front view of a secondary air supply system of an internal combustion engine according to an embodiment of the present invention.
Figure 2:
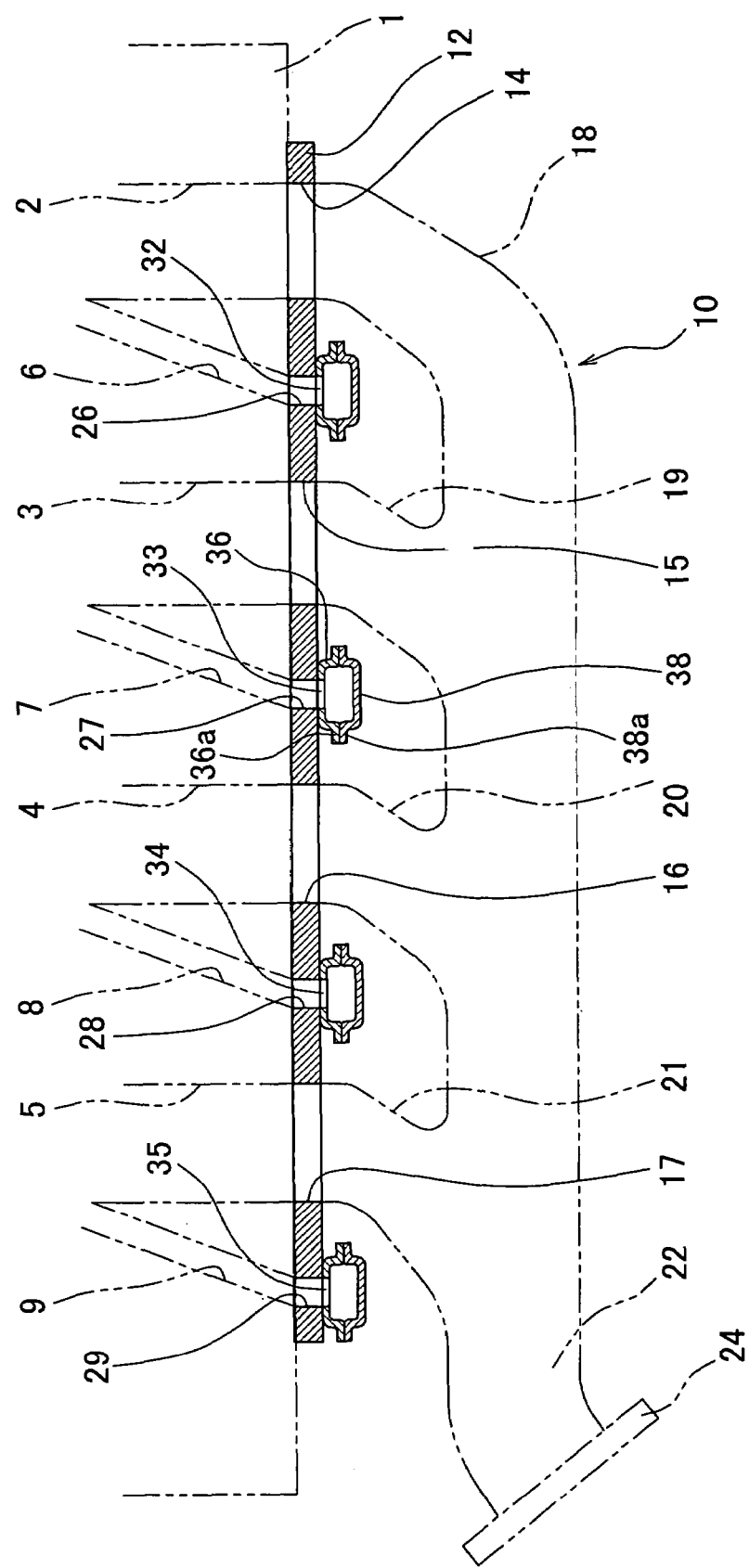
FIG. 2 is a diagram showing an enlarged sectional view taken along the line II-II in FIG. 1.

As shown in FIGS. 1 and 2, a cylinder head 1 of an internal combustion engine includes a plurality of exhaust holes 2-5 communicated with combustion chambers, and supply holes 6-9, respectively communicated with the exhaust holes 2-5.

To the cylinder head 1, a flange 12 of an exhaust manifold 10 is attached. The flange 12 includes through-holes 14-17 corresponding to the exhaust holes 2-5 of the cylinder head 1. When the flange 12 is attached to the cylinder head 1, the exhaust holes 2-5 are respectively communicated with the through-holes 14-17.

To the through-holes 14-17, branch pipes 18-21 are respectively connected. The branch pipes 18-21 are joined together and constitute a collecting pipe 22. A small flange 24 is attached to an end of the collecting pipe 22.

The flange 12 also includes a plurality of communication holes 26-29 penetrating the flange 12 and corresponding to the supply holes 6-9 of the cylinder head 1. When the flange 12 is attached to the cylinder 1, the supply holes 6-9 are respectively communicated with the communication holes 26-29. The flange 12 furthermore includes a plurality of attachment holes 30. A bolt (not shown) is inserted into each of the attachment holes 30, when the flange 12 is attached to the cylinder head 1.

To the flange 12, a lower shell 36, having connection holes 32-35 corresponding to the communication holes 26-29 of the flange 12 is attached. The lower shell 36 is combined with an upper shell 38.

The lower shell 36 and the upper shell 38 are made of plate materials and formed by pressing. The lower shell 36 and the upper shell 38 respectively include an end portion 36a and an end portion 38a formed along the entire circumference of the respective shells 36 and 38. The end portions 36a and 38a are formed so as to face each other, and disposed so as to be projecting approximately in parallel to the flange 12. The lower shells 36 and the upper shells 38 are expanded in opposite directions so that a supply path 40 is formed therebetween when the shells 36 and 38 are put together. The supply path 40 is branched and connected to the respective connection holes 32-35.

In the present embodiment, the through-holes 14-17 are transversally aligned on the flange 12. The communication holes 26-29 are also transversally aligned on the flange 12 and disposed collinear with the through-holes 14-17. The through-holes 14-17 and the communication holes 26-29 are alternately disposed.

The supply path 40 extends along the flange 12 in parallel to the alignment of the through-holes 14-17 and the communication holes 26-29. The supply path 40 is branched so as to be connected with the communication holes 26-29. Therefore, the lower shell 36 and the upper shell 38 extend along the flange 12, and are branched toward the respective communication holes 26-29.

Figure 5:
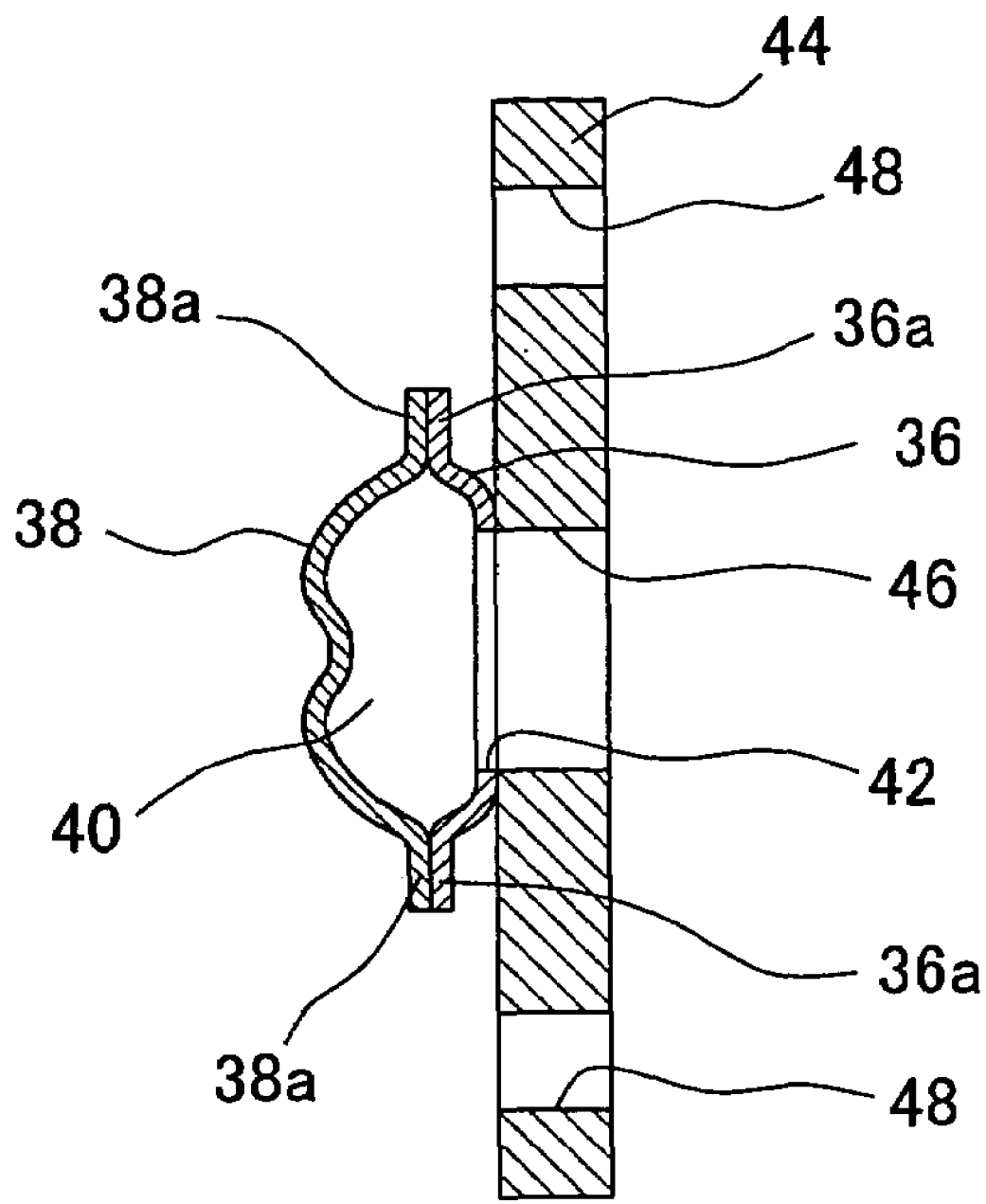
FIG. 5 is a diagram showing an enlarged sectional view taken along the line V-V in FIG. 1.

As shown in FIG. 5, in an end side of the lower shell 36, a through-hole 42 is provided extending toward the same direction as the direction of the connection holes 32-35. Around the through-hole 42, a small flange 44 is welded and secured. In FIG. 1, the small flange 44 is shown from the side of the upper shell 38. The small flange 44 is provided with a connection hole 46, which is concentric with the through-hole 42 of the lower shell 36, and one pair of attachment holes 48.

As shown in FIGS. 1 to 4, the flange 12 includes a plurality of support portions 50-52 protruding along the lower shell 36. The support portions 50-52 are respectively provided between the communication holes 26-29. The support portions 50-52 are formed so as to be in contact with the back surface of the lower shell 36. The lower shell 36 is secured to the support portions 50-52 by welding.

Although three support portions 50-52 are disposed in the present embodiment, the number of the support portions 50-52 is not limited to three. One support portion or more than three support portions may be provided depending on the necessity, in case the lower shell 36 and the upper shell 38 are vibrated. The support portions 50-52 protrude from the flange 12. Therefore, the support portions 50-52 can by formed easily, and the number thereof can be flexible. In case the lower shell 36 and the upper shell 38 are not vibrated, the support portions 50-52 are not necessary.

The lower shell 36 and the upper shell 38 are respectively provided with rib portions 36b and 38b sunken along the supply path 40. The rib portions 36b and 38b may be provided depending on the degree of the vibration of the lower shell 36 and the upper shell 38. The sectional shape of the rib portions 36b and 38b may be decided depending on the degree of the vibration.

For assembling the secondary air supply system according to the present embodiment, firstly, the lower shell 36 is placed on the flange 12 and positioned by aligning the connection holes 32-35 of the lower shell 36 with the communication holes 26-29 of the flange 12. The lower shell 36 is secured to the flange 12 by laser welding around the respective connection holes 32-35. The lower shell 36 is placed on the small flange 44 and positioned by aligning the through hole 42 of the lower shell 36 with the connection hole 46 of the small flange 44. The lower shell 36 is secured to the small flange 44 by laser welding around the through hole 42.

Secondly, the upper shell 38 is placed on the lower shell 36 such that the end portions 36a and 38a face each other. The end portions 36a and 38a are welded by laser along the entire circumferences thereof and secured. By laser welding, sputter can be inhibited from entering the supply path 40.

That is, in a case wherein the end portions 36a and 38a are welded by laser from the side of the end portion 38a of the upper shell 38, even if sputter is generated, the sputter flies toward the side of the end portion 36a of the lower shell 36. Therefore, the amount of sputter entering the supply path 40 is remarkably reduced, and failure caused by sputter entering the combustion engine can be inhibited. Although, welding is done by laser in the present embodiment, the way of welding is not limited to laser welding. Welding may be done by fused junction, such as arc welding, liquid-solid phase reaction junction, such as brazing, or solid phase junction, such as diffusion junction.

The following describes the operation of the secondary air supply system of the internal combustion engine according to the above-described embodiment.

First, when the internal combustion engine is operated, depending on the combustion order of respective combustion chambers, exhaust gas is discharged from respective exhaust holes 2-5. The exhaust gas passes through the branch pipes 18-21 and the collection pipe 22, and is discharged into an exhaust pipe (not shown) disposed in the downstream side.

Secondary air, supplied to the supply path 40, passes through the connection holes 32-35, the communication holes 26-29, and the supply holes 6-9, and is supplied into the exhaust holes 2-5. By the supplied secondary air, unburned gas contained in the exhaust gas is burned, and hydrocarbon (HC) and carbon monoxide (CO) in the exhaust gas are oxidized.

The above-described embodiment presents an example wherein the supply holes 6-9 of the cylinder head 1 are respectively disposed between the exhaust holes 2-5. The disposition is not limited to the above-described example, but can be set flexibly. Even the supply holes 6-9 are disposed in different positions, the shape of the lower shell 36 and the upper shell 38 and the connection holes 32-35 can be formed corresponding to the positions of the supply holes 6-9. In addition, manufacturing is easy because the lower shell 36 and the upper shell 38 can be formed by pressing.

In a case wherein imbalance is caused in the amount of the secondary air distributed from the supply path 40 into the respective connection holes 32-35, the amount of the secondary air can be easily adjusted, and the distribution amount can be approximately uniform. The adjustment can be made by changing the shape of the lower shell 36 and the upper shell 38 so as to change the shape of the sectional surface of the supply path 40 connected to the respective connection holes 32-35.

In a case wherein the lower shell 36 and the upper shell 38 are vibrated and generate noise, support portions 50-52 and the rib portions 36b and 38b can be formed. As a result, the rigidity of the system can be easily improved, and a measure to reduce the noise can be easily provided.

Figure 6:
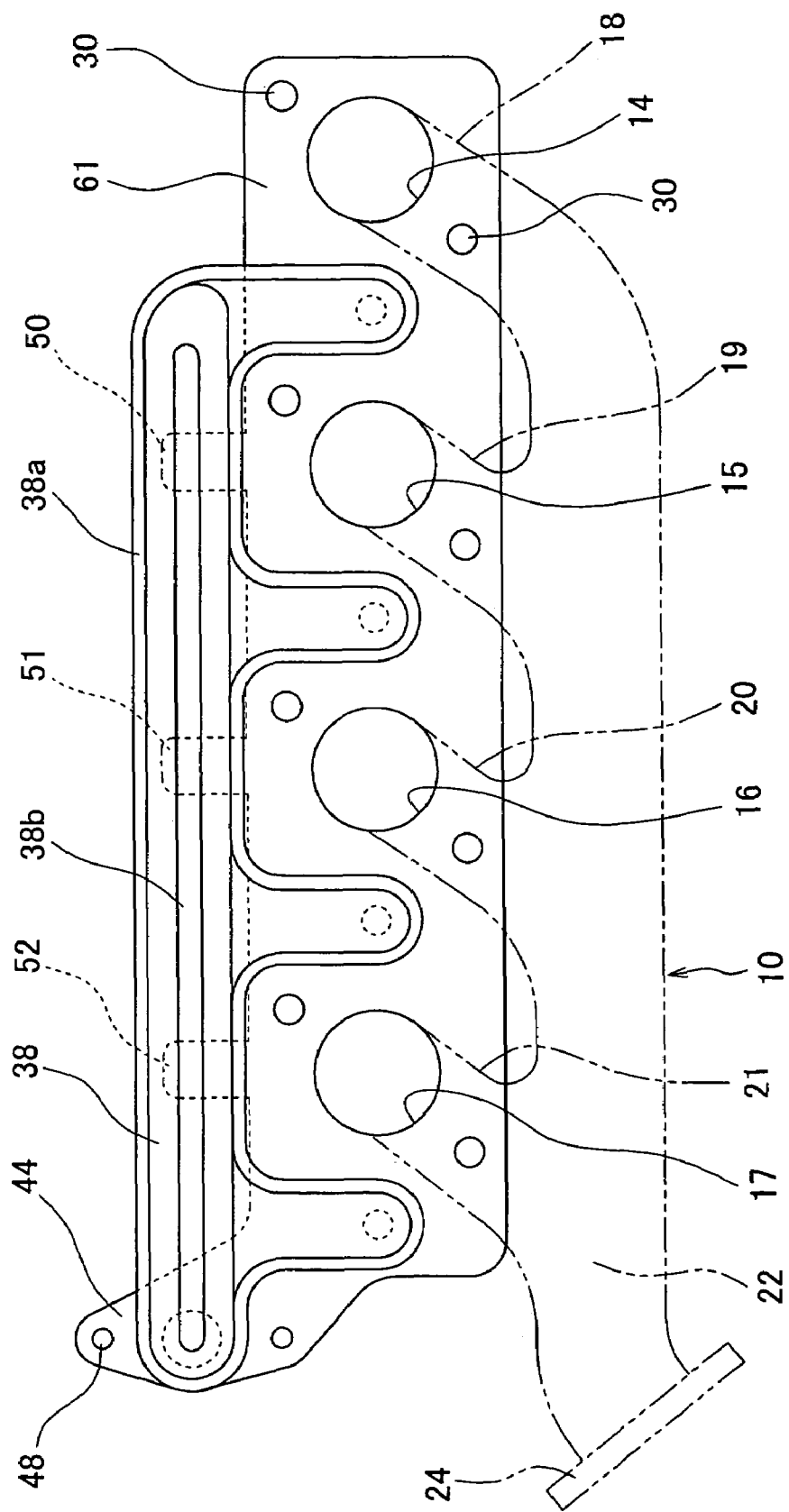
FIG. 6 is a diagram showing the front view of a secondary air supply system of an internal combustion engine according to another embodiment of the present invention.

As shown in FIG. 6, the flange 12 and the small flange 44 can be integrally formed as a large flange 61.

Figure 3:
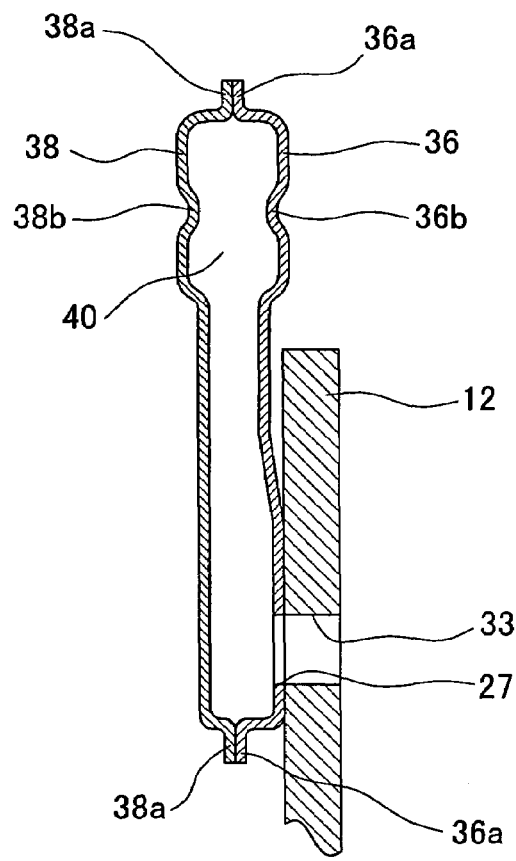
FIG. 3 is a diagram showing an enlarged sectional view taken along the line III-III in FIG. 1.
Figure 7:
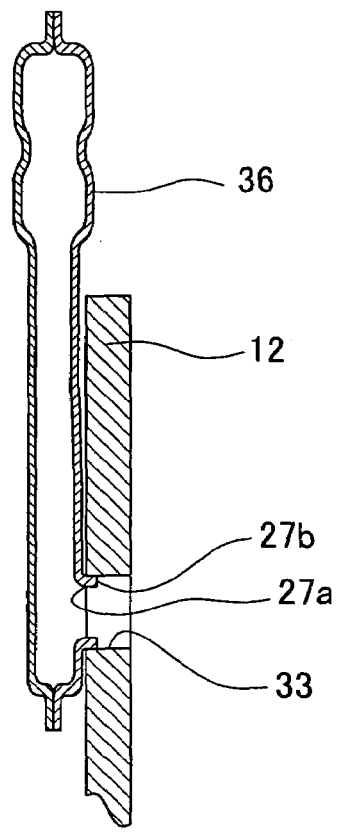
FIG. 7 is a sectional view showing a variation of the secondary air supply system of the internal combustion engine shown in FIG. 3.

In FIGS. 2 and 3, the lower shell 36 and the flange 12 are secured such that the bottom surface of the lower shell 36 is abutted on the surface of the flange 12. However, the way to secure the lower shell 36 and the flange 12 is not limited to this way. For example, as shown in FIG. 7, a portion of the lower shell 36 can be bent in the peripheral of the communication hole 27a (peripheral portion 27b) approximately at right angle to the bottom surface of the lower shell 36. While the peripheral portion 27b is inserted into the connection hole 33, the lower shell 36 and the flange 12 can be secured. The flange 44 and lower shell 36, shown in FIG. 5, may be secured in the same manner.

Figure 4:
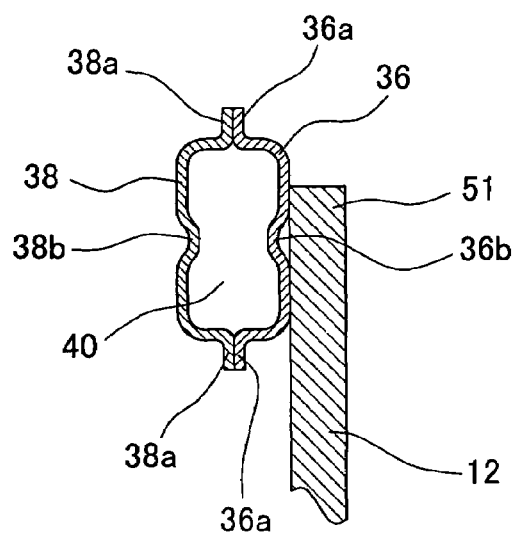
FIG. 4 is a diagram showing an enlarged sectional view taken along the line IV-IV in FIG. 1.
Figure 8:
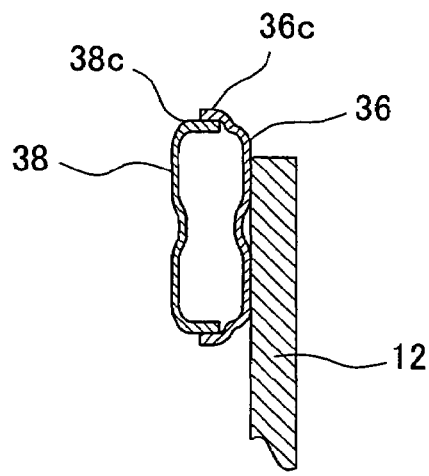
FIG. 8 is a sectional view showing a variation of the secondary air supply system of the internal combustion engine shown in FIG. 4.

In FIG. 4, the lower shell 36 and the upper shell 38 are connected in a state wherein the end portions 36a and 38a, extending in parallel to the flange 12, overlap with each other. However, the way to connect the lower shell 36 and the upper shell 38 is not limited to this way. For example, as shown in FIG. 8, the end portions 36c and 38c can be overlapped and secured without being extended in parallel to the flange 12.

Figure 9:
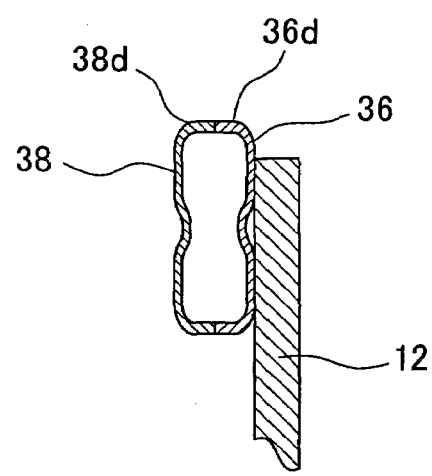
FIG. 9 is a sectional view showing a further variation of the secondary air supply system of the internal combustion engine shown in FIG. 4.

Alternatively, As shown in FIG. 9, the end portions 36d and 38d can be connected so as to be abutted on each other without being overlapped.

In the above-described embodiment, the small flange 44 is connected to the lower shell 36. However, the connection of the small flange 44 is not limited to this example. As shown in FIG. 10, the small flange 44 may be connected to the upper shell 38. Alternatively, as shown in FIGS. 11A, 11B, and 11C, the small flange 44 may be connected to a pipe, formed with the lower shell 36 and the upper shell 38, such that the pipe is communicated with the connection hole 46 of the small flange 44.

It is to be noted that the present invention is not limited to the above-described embodiments. Variations and modifications are possible within the scope of the invention.

What is claimed is:

1. A secondary air supply system for an internal combustion engine comprising:
   a cylinder head of the internal combustion engine including a row of cylinder head exhaust holes and a row of corresponding cylinder head air supply holes located between the cylinder head exhaust holes;
   an exhaust manifold attached to the cylinder head and including a manifold flange having a plurality of manifold exhaust holes communicating with corresponding ones of the plurality of cylinder head exhaust holes and with an exhaust collection pipe, and a plurality of manifold air supply holes communicating with corresponding ones of the plurality of cylinder head air supply holes; and
   a secondary air supply including:
      a separate lower shell having an inwardly facing surface and an opposed outwardly facing surface and a plurality of connection holes for alignment with a corresponding one of the plurality of manifold air supply holes, the outwardly facing surface of the lower shell abutting against the manifold flange, and following alignment of the plurality of connection holes with the corresponding one of the plurality of manifold air supply holes, the lower shell being secured to the manifold flange from the inwardly facing surface of the lower shell;
      a separate upper shell, having an inwardly facing surface and an outwardly facing surface and, only once the lower shell is secured to the manifold flange, a circumference of the upper shell being secured to a circumference of the lower shell, so that the upper and lower shells are joined with one another to define and form
         an air supply passage extending parallel to and laterally offset from the row of cylinder head air supply holes and the manifold, and
         a plurality of air supply branch passages, and each branch passage extending laterally from the air supply passage to one of the plurality of connection holes communicating with a corresponding one of the cylinder head air supply holes.

2. The secondary air supply system as set forth in claim 1, wherein the manifold flange includes at least one support portion protruding from the manifold flange and integrally formed with the manifold flange and the lower shell is secured to the at least one support portion protruding from the manifold flange in a region forming the air supply passage.

3. The secondary air supply system as set forth in claim 1, wherein the manifold flange furthermore includes a small flange integrally formed therewith, the small flange includes at least one flow hole communicating with the air supply passage, and is attached to the outwardly facing surface of the lower shell.

4. The secondary air supply system as set forth in claim 1, wherein the lower shell and the upper shell each respectively include a substantially planar circumferential end portion extending about a periphery thereof, and the end portions of the lower shell and the upper shell are combined and welded to one another.

5. The secondary air supply system as set forth in claim 4, wherein the end portions of the lower shell and the upper shell are combined so as to overlap one another.

6. The secondary air supply system as set forth in claim 4, wherein the end portions of the lower shell and the upper shell are combined so as to abut one another.

7. The secondary air supply system as set forth in claim 1, wherein the row of cylinder head exhaust holes is collinear with the row of corresponding cylinder head air supply holes.

8. A secondary air supply system for an internal combustion engine including a cylinder head having a row of cylinder head exhaust holes and a row of corresponding cylinder head air supply holes located between the cylinder head exhaust holes, and an exhaust manifold attached to the cylinder head and including a flange having a plurality of manifold exhaust holes communicating with corresponding ones of the plurality of cylinder head exhaust holes and with an exhaust collection pipe and a plurality of manifold air supply holes communicating with corresponding ones of the plurality of cylinder head air supply holes, the secondary air supply system comprising:

a separate lower shell having an inwardly facing surface and an opposed outwardly facing surface and a plurality of connection holes for alignment with a corresponding one of the plurality of manifold air supply holes, the outwardly facing surface of the lower shell abutting against the manifold flange, and following alignment of the plurality of connection holes with the corresponding one of the plurality of manifold air supply holes, the lower shell being secured to the manifold flange by welding, via the inwardly facing surface of the lower shell, around each connection hole and the lower shell having a circumferential portion;

a separate upper shell having an inwardly facing surface and an outwardly facing surface and, only once the lower shell is secured to the manifold flange, a circumferential portion of the upper shell being secured to the circumferential portion of the lower shell, so that the upper and lower shells are joined with one another to define and form an air supply passage extending parallel to and laterally offset from the row of cylinder head air supply holes and the manifold, and a plurality of air supply branch passages, each branch passage extending laterally from the air supply passage to one of the plurality of connection holes communicating with a corresponding one of the cylinder head air supply holes.

9. The secondary air supply system as set forth in claim 8, wherein the row of cylinder head exhaust holes is collinear with the row of corresponding cylinder head air supply holes.

10. A secondary air supply system for an internal combustion engine including a cylinder head having a row of cylinder head exhaust holes and a row of corresponding cylinder head air supply holes located between the cylinder head exhaust holes, and an exhaust manifold attached to the cylinder head and including a flange having a plurality of manifold exhaust holes communicating with corresponding ones of the plurality of cylinder head exhaust holes and with an exhaust collection pipe and a plurality of manifold air supply holes communicating with corresponding ones of the plurality of cylinder head air supply holes, the secondary air supply system comprising:

a separate lower shell being formed from plate material, the lower shell having an inwardly facing surface and an opposed outwardly facing surface and a plurality of connection holes for alignment with a corresponding one of the plurality of manifold air supply holes, the outwardly facing surface of the lower shell abutting against the manifold flange, and following alignment of the plurality of connection holes with the corresponding one of the plurality of manifold air supply holes, the lower shell being secured to the manifold flange by welding, via the inwardly facing surface of the lower shell, around each connection hole, and the lower shell having substantially planar circumferential end portion;

a separate upper shell being formed from plate material and having at least one rib formed therein, the upper shell having an inwardly facing surface and an outwardly facing surface and, only once the lower shell is secured to the manifold flange, a substantially planar circumferential end portion of the upper shell being secured to the substantially planar circumferential end portion of the lower shell, so that the upper and lower shells are joined with one another to define and form an air supply passage extending parallel to and laterally offset from the row of cylinder head air supply holes and the manifold, and a plurality of air supply branch passages, each branch passage extending laterally from the air supply passage to one of the plurality of connection holes communicating with a corresponding one of the cylinder head air supply holes.

11. The secondary air supply system as set forth in claim 10, wherein the separate lower shell, formed from plate material, has at least one rib formed therein.

* * * * *